United States Patent
Lieblich et al.

(10) Patent No.: US 7,269,757 B2
(45) Date of Patent: *Sep. 11, 2007

(54) DISTRIBUTED COMPUTER MONITORING SYSTEM AND METHODS FOR AUTONOMOUS COMPUTER MANAGEMENT

(75) Inventors: Jason Lieblich, Hollis, NH (US); Dustin Norman, Nashua, NH (US)

(73) Assignee: Reflectent Software, Inc., Lowell, MA (US)

( * ) Notice: Subject to any disclaimer, the term of this patent is extended or adjusted under 35 U.S.C. 154(b) by 459 days.

This patent is subject to a terminal disclaimer.

(21) Appl. No.: 10/626,394

(22) Filed: Jul. 24, 2003

(65) Prior Publication Data
US 2005/0022209 A1    Jan. 27, 2005

Related U.S. Application Data (63) Continuation of application No. 10/618,092, filed on Jul. 11, 2003.

(51) Int. Cl.
*G06F 11/00*    (2006.01)
(52) U.S. Cl. .......................... 714/37; 714/21
(58) Field of Classification Search ............. 714/21, 714/37
See application file for complete search history.

(56) References Cited

U.S. PATENT DOCUMENTS

| | | | | |
|---|---|---|---|---|
| 5,615,323 A | * | 3/1997 | Engel et al. | 345/440 |
| 5,655,081 A | | 8/1997 | Bonnell et al. | 395/200 |
| 5,924,096 A | | 7/1999 | Draper et al. | 707/10 |
| RE36,417 E | * | 11/1999 | Perelson et al. | 714/38 |
| 6,012,152 A | | 1/2000 | Douik et al. | 714/26 |
| 6,327,677 B1 | * | 12/2001 | Garg et al. | 714/37 |
| 6,434,616 B2 | * | 8/2002 | Urano et al. | 709/224 |
| 6,513,065 B1 | | 1/2003 | Hafez et al. | 709/224 |
| 6,523,035 B1 | | 2/2003 | Fleming et al. | 707/10 |
| 6,560,647 B1 | | 5/2003 | Hafez et al. | 709/224 |
| 6,564,174 B1 | | 5/2003 | Ding et al. | 702/186 |
| 6,622,264 B1 | * | 9/2003 | Bliey et al. | 714/26 |
| 6,629,266 B1 | * | 9/2003 | Harper et al. | 714/38 |
| 6,665,778 B1 | * | 12/2003 | Assaf | 711/156 |

(Continued)

OTHER PUBLICATIONS

PowerPoint Presentation by Infinetcorp Software and Services "The Company *ifcheck* Software Consulting Services" http://www.infinetcorp.com/product/download/pkgdir/ifcheckpp.ppt (39 pgs.).

(Continued)

*Primary Examiner*—Scott Baderman
*Assistant Examiner*—Joshua Lohn
(74) *Attorney, Agent, or Firm*—Choate Hall & Stewart, LLP (57) ABSTRACT

Methods and systems are provided by which a flexible, efficient and easy-to-use real-time enterprise management system is provided. The methods and systems provided can effectively monitor and manage the resources and events of each of a plurality of computers within a fluidly changing network environment (e.g. client/server and peer-to-peer networks). Also provided are methods and systems which allow an individual computer to determine whether or not its current performance characteristics vary from their acceptable parameters without having to contact any other computer. Finally provided are methods and systems by which computers can analyze and store data regarding their performance characteristics in real time.

57 Claims, 5 Drawing Sheets

U.S. PATENT DOCUMENTS

| | | | |
|---|---|---|---|
| 6,732,294 B2* | 5/2004 | Mackrory et al. | 714/25 |
| 6,898,556 B2* | 5/2005 | Smocha et al. | 702/186 |
| 7,159,146 B2* | 1/2007 | Bowers et al. | 714/37 |
| 2003/0079154 A1* | 4/2003 | Park et al. | 714/1 |
| 2004/0078657 A1* | 4/2004 | Gross et al. | 714/15 |

OTHER PUBLICATIONS

Tripwire Manager for Enterprise—Wide Security & Network Management "The "Dashboard,"" http://www.tripwire.com/products/manager/functional.cfm? (5 pgs.) 2003.

* cited by examiner

DISTRIBUTED COMPUTER MONITORING SYSTEM AND METHODS FOR AUTONOMOUS COMPUTER MANAGEMENT

FIELD OF THE INVENTION

This application is a continuation-in-part of prior application U.S. Ser. No. 10/618,092, filed on Jul. 11, 2003, the entire disclosure of which is incorporated by reference herein. The present invention relates to the collection, analysis, and management of system resource data in distributed, networked or enterprise computer systems, and particularly to systems and methods for organizing, analyzing and responding to resources and events generated by individual computers within a networked computer system.

BACKGROUND OF THE INVENTION

Within business organizations, educational institutions, and other large entities, individual computers are increasingly connected to each other by means of a network. As the number of computers on a network increases, the complex task of managing the networked computers quickly overwhelms information technology departments and service providers. Often, data and processing are dispersed over a heterogeneous network comprising a variety of distinct, interconnected and geographically remote computers.

Among the reasons for this approach are to offload non-mission-critical processing from the mainframe, to provide a pragmatic alternative to centralized corporate databases, to establish a single computing environment, to move control into the operating divisions of the company, and to avoid having a single point of failure. For example, many business entities have one client/server network installed in each regional office, in which a high-capacity computer system operates as the server supporting many lower-capacity client desktop computers. The servers in such a business entity are also commonly connected to one another by a higher-level network known as a wide area network. In this manner, users at any location within the business entity can theoretically access resources available anywhere in the company's network regardless of the location of the resource.

Alternatively, many businesses use a peer-to-peer ("P2P") network computing approach. A peer-to-peer network is essentially the same as a client/server network with all clients and no servers. However, peer-to-peer networks have a variety of unique qualities which distinguish them from conventional client/server networks. In a peer-to-peer network, for example, the network composition can change dynamically and continuously, as peers join and leave the network. Consequently, it is frequently necessary for applications running on individual computers to determine the presence or absence of a particular machine before attempting to communicate with said machine. Peer-to-peer networks are usually decentralized and allow for the spontaneous, continuous union of connected machines (or "peers") communicating with one another and sharing and exploiting common resources.

The flexibility gained for users with both client/server and P2P networks comes with a price, however. It is very difficult to manage diverse and geographically-disparate networks. Machines installed in a typical wide area network are frequently not all of the same variety. One office of a given enterprise may be using IBM personal computers with UNIX operating systems, another office may employ Sun Microsystems workstations with LINUX operating systems, and a third office may employ Hewlett-Packard personal computers running Microsoft Windows® XP. Also, applications present on the machines throughout the network vary not only in terms of type, but also product release level within an application type. Moreover, the applications available are changed frequently by individual users throughout the network, and failure events in such a network are usually difficult to catch until after a failure has already occurred.

One class of network management systems has been implemented according to the well-known Simple Network Management Protocol ("SNMP") as described, for example, in Marshall T. Rose, The Simple Book (2d ed., PTR Prentice-Hall, Inc., 1994). The SNMP protocol specifies that only one "agent" will exist on a given managed client in a network regardless of the number of server processes interested in monitoring the resources associated with the client. The SNMP protocol is designed such that a set of information called a Management Information Base ("MIB") will be locally available in storage for each such agent in the network. The MIB acts to define the objects, or resources, that can be monitored using the SNMP protocol. In operation, an SNMP agent will monitor objects associated with its client in accordance with the information comprising the MIB independently of the existence of a server process interested in the objects. However, an SNMP system is inefficient and inflexible in that a server must request information from the agent about objects on a piecemeal basis, one request per piece of information, causing increased network traffic, overhead in the computer system running the console and latency in detecting abnormal conditions. In addition, SNMP does not work properly over P2P networks, as there are no servers on P2P networks to direct the clients as to which data to record. Finally, SNMP agents are relatively simple, and serve to merely store information about the system without actively analyzing or modifying the particular client upon which the information is stored.

Other enterprise management systems available in the prior art operate primarily on client/server networks. Like SNMP, these systems typically require the existence of servers or managers to direct the individual clients as to what information to track or store. Clients themselves have little autonomy. In addition, the information is typically recorded in a mere log file, and is not easily searchable or comparable by the client against information recorded previously. In addition, real-time analysis is nearly impossible for these systems. A network manager typically must wait until data is compiled before making changes to individual clients on the network. Moreover, clients do not have the autonomy to change themselves in response to any actions or events that they may be experiencing. Thus, users experiencing problems on individual clients often have to wait until administrators or managing servers were available in order to solve said problems. As information technology departments are often understaffed, the time a given user might have to wait until his or her problems are resolved could be significant, often amounting to hours or days.

SUMMARY OF THE INVENTION

Thus, a need exists for a flexible, efficient, easy-to-use real-time enterprise management system which can effectively manage a wide variety of computing platforms in a fluidly changing network environment. Also needed is a solution where an individual machine can determine whether or not its current resources and events vary from their acceptable parameters without having to contact any other machine. Further needed is the ability to analyze and store data regarding such resources and events in real time.

In satisfaction of these needs, embodiments of the present invention provide systems and methods for monitoring and managing the resources and events of each of a plurality of networked computers.

In accordance with one aspect of the invention, a distributed system is provided which monitors the resources and events of each of a plurality of networked computers. The system comprises a first computer, a first database and a first agent. The first database is associated with the first computer and records two data elements comprising information about the current state of the first computer at a given time. A first agent executes on the first computer and compares the two data elements in order to assess the occurrence of an exceptional event. In various embodiments of this system, if an exceptional event has occurred, the first agent may choose to either take a predetermined action, ask another agent for input, ask a human user for input or ask a server for input.

In accordance with another aspect of the invention, a method is provided for analyzing resources and events of a computer. The method comprises: (a) storing in a first database located within the first computer a first dataset describing the resource and event characteristics of the first computer at a first moment in time; (b) storing in the first database a second dataset describing the resource and event characteristics of the first computer at a second moment in time; (c) comparing the first dataset and the second dataset in order to determine whether the differences indicate the occurrence of an exceptional event; and (d) if an exceptional event has occurred, initiating an exception handling routine. Embodiments of this method also comprise notifying other computers and human users of the exceptional event and requesting input.

In accordance with a third aspect of the invention, a peer-to-peer system is provided for monitoring the status of computers in a computer network. The system comprises a plurality of computer agents, each agent capable of repeatedly storing status information in a database at discrete points in time, each agent further capable of receiving, storing in the database, and responding to queries made from any other agent. In this system, each agent determines whether or not its current performance is consistent with its past performance based upon a continuous, real-time analysis of the agent's own database and, in the event that an agent determines that its current performance is inconsistent with its past performance, and addresses the inconsistency.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE PREFERRED EMBODIMENTS

The methods and systems for organizing, analyzing and responding to events will now be described with respect to preferred embodiments. However, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention.

A. Network Topology.

Figure 1:
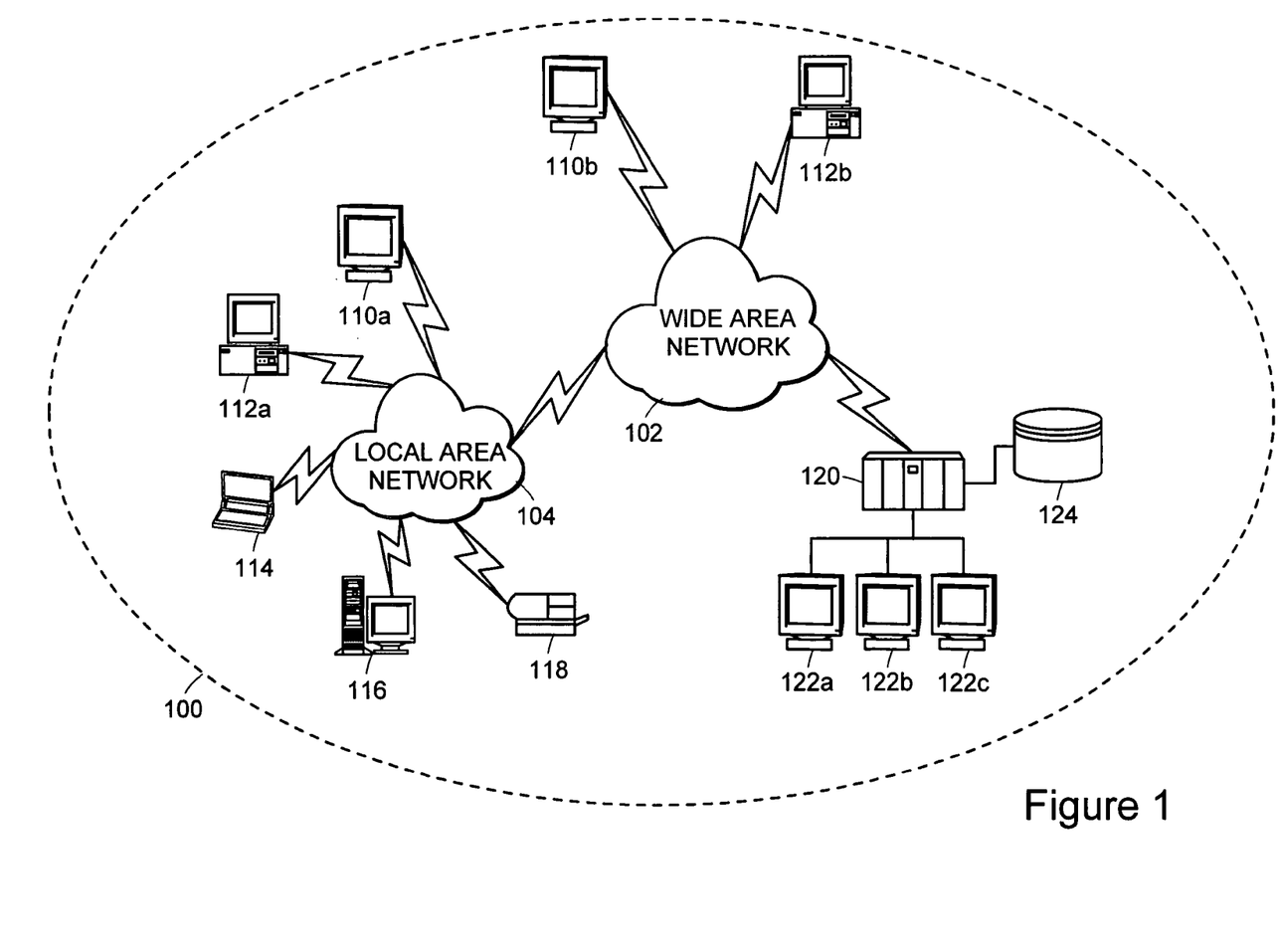
FIG. 1 illustrates a typical enterprise computing environment according to one embodiment of the present invention.

FIG. 1 illustrates a typical enterprise computing environment according to one embodiment of the present invention. An enterprise 100 comprises a plurality of computer systems which are interconnected through one or more networks. Although only one embodiment is shown in FIG. 1, the enterprise 100 may comprise a variety of heterogeneous computer systems and networks which are interconnected in a variety of ways and which run a variety of software applications.

One or more local area networks (each, a "LAN") 104 may be included in the enterprise 100. A LAN 104 is a network that usually spans a relatively short distance. Typically, a LAN 104 is confined to a single building or group of buildings. Each node (i.e., individual computer system or device) connected to the LAN 104 preferably has its own Central Processing Unit ("CPU") with which it executes programs, and each node is also able to access data and devices anywhere on the LAN 104. The LAN 104 thus allows many users to share devices (e.g., printers) as well as data stored on file servers 124. The LAN 104 may be characterized by any of a variety of network topologies (i.e., the geometric arrangement of devices on the network), protocols (i.e., the rules and encoding specifications for sending data, and whether the network uses a peer-to-peer or client/server architecture), and media (e.g., twisted-pair wire, coaxial cables, fiber optic cables, radio waves). As illustrated in FIG. 1, the enterprise 100 includes one LAN 104. However, in alternate embodiments the enterprise 100 may include a plurality of LANs 104 which are coupled to one another through a wide area network ("WAN") 102. A WAN 102 is a network that typically spans a relatively large geographical area, and may connect individual computers or entire LANs which are very far apart.

Each LAN 104 comprises a plurality of interconnected computer systems and optionally one or more other devices: for example, one or more workstations 110a, one or more personal computers 112a, one or more laptop or notebook computer systems 114, one or more server computer systems ("Servers") 116, and one or more network printers 118. As illustrated in FIG. 1, the LAN 104 comprises one of each of computer systems 110a, 112a, 114, and 116, and one printer 118. The LAN 104 may be coupled to other computer systems, devices or LANs through a WAN 102.

One or more mainframe computer systems 120 may optionally be coupled to the enterprise 100. As shown in FIG. 1, the mainframe 120 is coupled to the enterprise 100 through the WAN 102, but alternatively one or more mainframes 120 may be coupled to the enterprise 100 through one or more LANs 104. As shown, the mainframe 120 is coupled to a storage device or file server 124 and mainframe terminals 122a, 122b, and 122c. The mainframe terminals 122a, 122b, and 122c access data stored in the storage device or file server 124 coupled to or comprised in the mainframe computer system 120.

The enterprise 100 may also comprise one or more computer systems which are connected to the enterprise 100 through the WAN 102 including, for example, a workstation 110b and a personal computer 112b. In other words, the enterprise 100 may optionally include one or more computer systems which are not coupled to the enterprise 100 through a LAN 104.

B. System Architecture.

1. Hardware.

In the preferred embodiment, a variety of computer systems are able to periodically or continuously communicate with each other via a LAN, WAN or other network type. Although a computer system may comprise a personal computer 112a, laptop 114, a Server 116, a mainframe 120 or the like, throughout this disclosure we will use a workstation 110a, (such as the HP workstation XW4100, sold by the Hewlett-Packard Company) as our exemplary computer system. However, one skilled in the art will recognize that the principles described herein would apply equally to the other computer systems illustrated in FIG. 1.

Figure 1A:
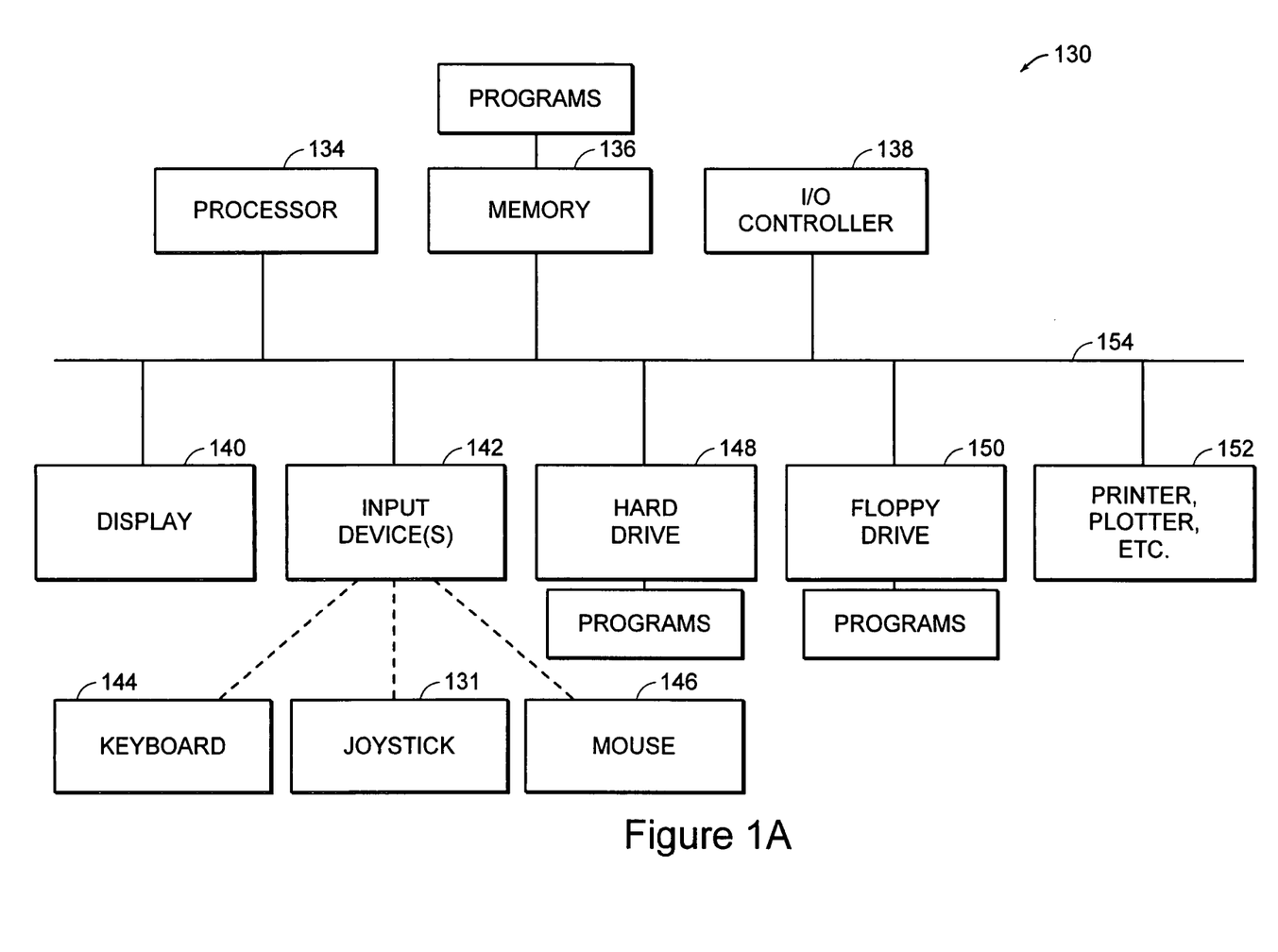
FIG. 1A is a block diagram illustrating aspects of a typical computer.

Referring now to FIG. 1A, a typical computer system 130 as known in the prior art includes a Central Processing Unit ("CPU") 134, a main memory unit 136 for storing programs and/or data, an input/output ("I/O") controller 138, a display device 140, and a data bus 154 coupling these components to allow communication between these units. The memory 136 may include random access memory ("RAM") and read only memory ("ROM"). The computer system 130 typically also has one or more input devices 142 such as a keyboard 144 (e.g., an alphanumeric keyboard and/or a musical keyboard), a mouse 146, and, in some embodiments, a joystick 131.

The computer system 130 also typically has a hard disk drive 148 and a floppy disk drive 150 for receiving floppy disks such as 3.5-inch disks. Other devices 152 also can be part of the computer system 130 including output devices (e.g., a printer) and/or optical disk drives for receiving and reading digital data on a CD-ROM. In the preferred embodiment, one or more computer programs define the operational capabilities of the computer system 130. These programs can be loaded onto the hard drive 148 and/or into the memory 136 of the computer system 130 via the floppy drive 150. Applications may be caused to execute by double clicking a related icon displayed on the display device 140 using the mouse 146 or through various other means.

In the preferred embodiment, each workstation 110a preferably comprises computer programs stored on a non-volatile memory source (such as a hard drive 148 or flash memory) or accessible to said workstation 110a via the network. Each workstation 110a typically comprises a CPU, such as the Pentium 4® processor by Intel Corporation, with an associated memory media. The memory media stores program instructions of the computer programs, wherein the program instructions are executable by the CPU. The memory media preferably comprises system memory, such as RAM 136, and nonvolatile memory, such as a hard disk 148. In the preferred embodiment, each workstation 110a further comprises a display 140, a keyboard 144 and a mouse 146. The workstation 110a is operable to execute computer programs.

2. Software.

Figure 2:
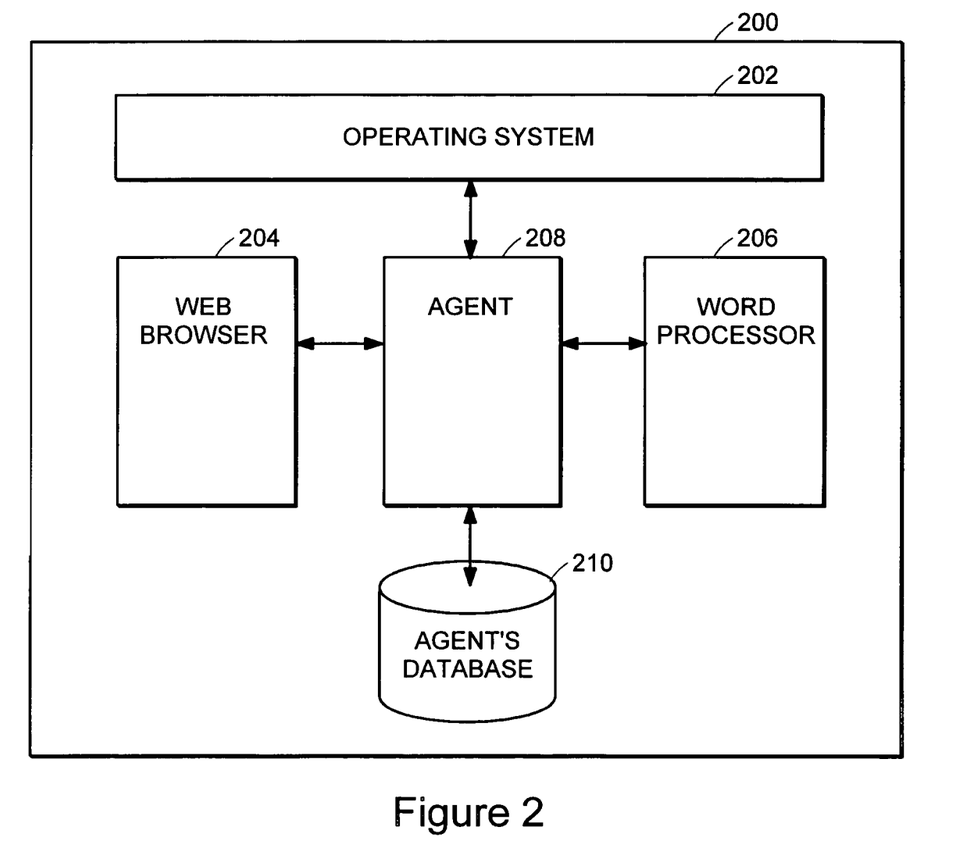
FIG. 2 is a block diagram illustrating the different software components executing on a workstation according to an exemplary embodiment of the present invention.

FIG. 2 is a block diagram 200 illustrating the different software components executing on workstation 110a according to an exemplary embodiment of the present invention. As illustrated, executing on workstation 110a are an operating system 202, a web browser 204, a word processor 206 and an Enterprise Management Agent 208. In addition, an Agent's Database 210 is also maintained on workstation 110a.

The operating system 202 is responsible for performing basic tasks, such as recognizing input from a keyboard, sending output to a display screen, keeping track of files and directories on a hard drive and controlling peripheral devices such as scanners and printers. The operating system 202 is also responsible for managing the execution of other programs, including without limitation, the Agent 208, web browser 204, word processor 206 and Agent's Database 210. Common examples of acceptable operating systems include Windows® XP by Microsoft Corporation. The operating system 202 also maintains information relating to system security, memory usage, currently executing processes, network communications, CPU usage and the like.

The web browser 204 is a software application typically used to locate and display web pages or other information on the workstation 110a. The web browser 204 also typically maintains a list of a user's favorite web sites and facilitates communication with various web sites and Internet portals. In addition, the web browser 204 can also track information regarding web site accesses, including time between access and request, frequently accessed websites, privacy and security information, and descriptive information about a given web page. Common examples of acceptable web browsers 206 include Netscape Navigator by Netscape Communications Corporation and Internet Explorer by Microsoft Corporation.

The word processor 206 is a software application typically used to create, modify, display and print documents. The word processor 206 also allows a user to store and retrieve said documents from either local (e.g. a hard disk internal to the workstation 110a) or remote (e.g. a file server 124) storage locations. In addition, the word processor typically tracks recently accessed documents, document properties (e.g. date created, modified or accessed), document version and the like. Common word processors 206 include Microsoft® Word by Microsoft Corporation and WordPerfect by Corel Corporation.

In the preferred embodiment, when software applications such as the web browser 204 and the word processor 206 are executed on the workstation 110a, the Agent 208 is operable to monitor, analyze, and control these applications, as well as the resources and events of the workstation 110a. The resources and events of the workstation 110a include, without limitation:

the processes executing on the workstation 110a;
the system resources (e.g. CPU usage, memory usage and page file usage);
application events and errors (e.g. fatal exceptions and dialog boxes);
shared network resources (e.g. network adapter, link speed, latency and network utilization);
shared network systems (e.g.; file servers 124 and printers 118);
user actions (e.g. text input, response to dialog boxes, application usage); and
other events facilitated by the operating system 202.

As discussed previously, the workstation 110a executes or runs a plurality of software applications or processes. Each software application or process consumes a portion of the resources of the workstation and/or network. For example, CPU time, memory usage, hard disk usage, network bandwidth, and input/output (I/O). In the preferred embodiment, software comprising the Agent 208 continuously monitors the resources and events of the workstation, and periodically records information about said resources and events to the Agent's Database 210.

The Agent's Database 210 is a collection of information organized in such a way that it can quickly categorize, select, store and retrieve desired pieces of data relating to the resources and events of the workstation 110a. Commercially available databases include Oracle Corporation's Oracle 9i Database, the DB2 Universal Database by International Business Machines Corporation or Microsoft Jet by Microsoft Corporation. The Agent's Database 210 may be stored in RAM or on the hard disk. The Agent 208 uses the Agent's Database 210 to store and retrieve information related to the resources and events of the workstation 110a.

3. The Agent.

Figure 3:
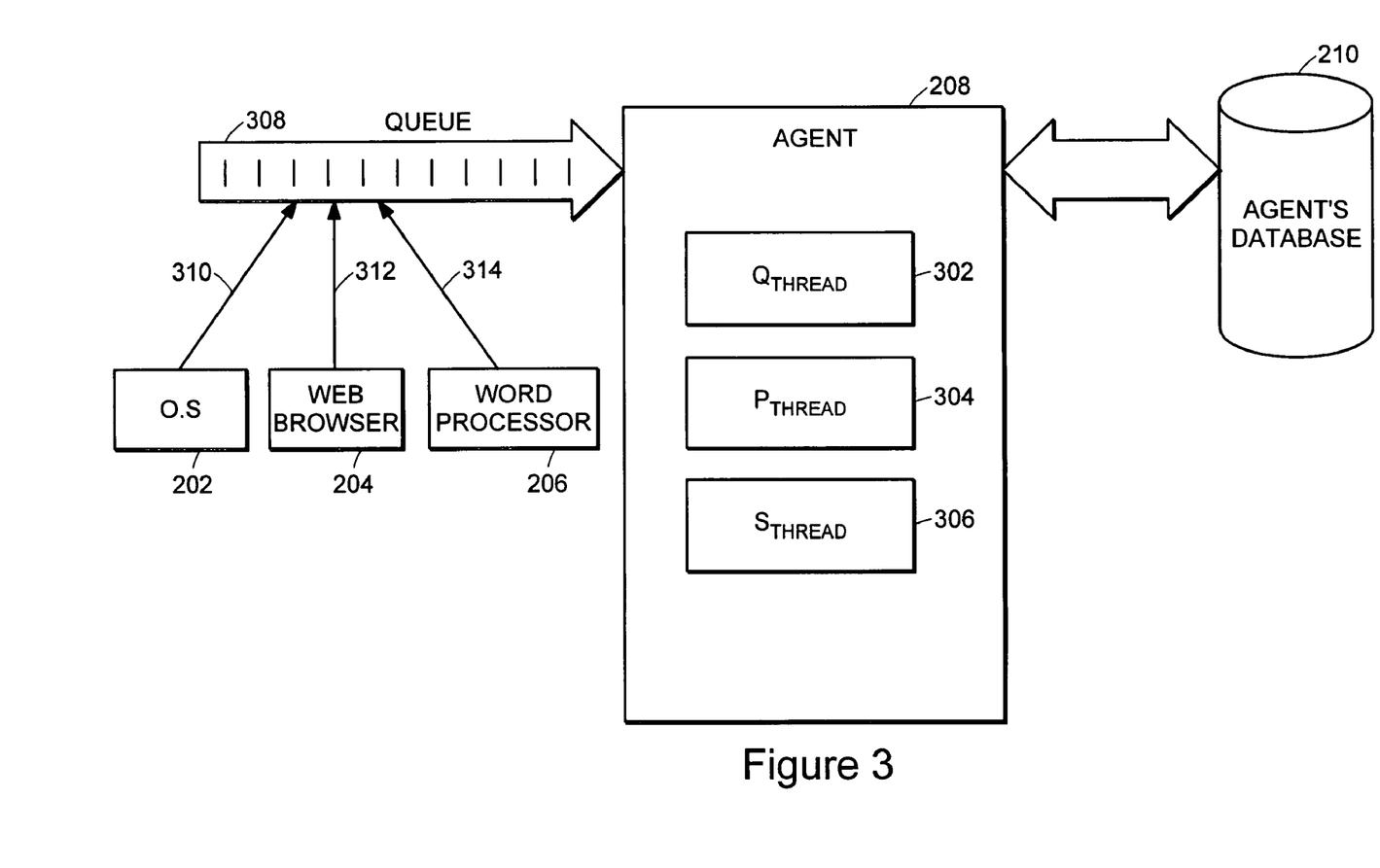
FIG. 3 is a block diagram illustrating the different elements of the Agent and their interaction with the applications execution on the workstation.

FIG. 3 is a block diagram illustrating the different elements of the Agent 208 and their interaction with the applications executing on the workstation 110a. As illustrated, the Agent 208 is preferably a multi-threaded, multi-tasking software application. In the preferred embodiment, three major threads affect the majority of the agent's tasks. Specifically, these three threads comprise a Queue managing thread (the "Qthread") 302, a Performance managing thread (the "Pthread") and a Scheduling thread (the "Sthread"). These threads, along with other aspects of the Agent 208, work together to monitor and manage the resources and events of the workstation 110a.

a. The Qthread.

The Qthread is preferably responsible for instantiation of both a Queue 308 and the Agent's Database 210. After the creation of the Queue 308 and Agent's Database 210, the Qthread 302 preferably manages the flow of data into and out of the Queue 308, organizes the Queue 308, and manages the data flow into and out of the Agent's Database 210.

Preferably, the Queue 308 is a double-buffered data queue which allows for multiple process data writing and single process data reading. Upon initialization, the Agent 208 hooks into each currently running application via known hooking methodologies, for example the operating system 202, the web browser 204 and the word processor 206 and establishes interception modules ("ZIntrcpt") 310, 312, 314 between each application and the Queue 308.

In the preferred embodiment, each ZIntrcpt module 310, 312, 314 continually monitors one application and periodically, or upon the occurrence of certain specified events, adds data to the Queue 308. The data added to the Queue 308 is application and context specific. For example, in the embodiment illustrated in FIG. 3, a first ZIntrcpt 310 is assigned to monitor the operating system 310. The first ZIntrcpt 310 watches the processes and variables of the operating system 310, and periodically writes to the Queue information such as the percentage of CPU used on each currently executing application, the memory usage and the network usage by the workstation 110a. In this embodiment, a second ZIntrcpt 312 is assigned to monitor the web browser 204. As the web browser executes, the second ZIntrcpt 312 writes information to the Queue 308 concerning the pages that the web browser 204 has visited, the latency between page requests and page views, and the time of day that each page is viewed. Similarly a third ZIntrcpt 314 monitors the word processor 206 and writes information to the Queue 308 regarding the documents accessed, the length of time necessary to store and retrieve documents, and any errors or exceptions which occurred during operation of the word processor 206. Note, although in this embodiment the ZIntrcpts 310, 312 and 314 are assigned to monitor applications and record data as set forth above, one skilled in the art will recognize that virtually any data from any application may be monitored and recorded in similar fashion.

As the ZIntrcpts 310, 312 and 314 add data to the Queue 308, the Qthread 302 continually monitors and analyzes the Queue's 308 content. In the event that the Queue 308 nears its capacity, the Qthread 302 flushes data to the Agent's Database 210. In addition, as the Qthread 302 encounters any urgent system alerts or events within the Queue 308, the Qthread immediately provides them to the Agent 208, records them in the Agent's Database 210 and preferably initiates emergency action routines within the Agent 208.

b. The Pthread.

In the preferred embodiment, the Pthread 304 continually monitors the performance of the workstation 110a. Preferably, the Pthread queries the operating system 202 to determine the current status of the resources and events of the workstation 110a. The Pthread 304 preferably reviews and analyzes this data (whether through the use of the Queue or not), and compares it with historical information saved upon the Agent's Database 210. For example, the Pthread 304 can receive new information about the memory usage or CPU usage and compare it with historical information of the same type previously stored to the Agent's Database 210. If there is an unacceptably large variance between the new data and the historical data obtained from the Agent's Database 210, the Pthread can initiate emergency action routines within the Agent 208.

c. The Sthread.

In the preferred embodiment, the Sthread 306 initializes and maintains lightweight processes ("scheduled items") that perform a variety of useful functions with minimal use of the CPU. Preferably, the scheduled items perform a task or set of tasks periodically. For example, every five seconds, a scheduled item can check with the operating system 202 to determine whether or not the user on workstation 110a is idle. If the user is in fact idle, then the Sthread will preferably perform a variety of useful, processor-intensive functions including, for example, compacting the Agent's Database 210 or deleting unnecessary information from RAM or from the hard disk. In addition, on a timely basis and when required, the Sthread is also responsible for aggregating and pruning the Agent's database, compacting and cleaning up any internal data structures.

In addition, a scheduled item can perform a variety of routine tasks and record the requisite data to the Agent's Database 210. For example, in the preferred embodiment, a scheduled item may request and retrieve certain performance statistics from the operating system 202 every three seconds including, without limitation, CPU usage, memory usage and page file usage. This three-second "data snapshot" can then be analyzed by the Agent 208 and/or stored in the Agent's Database 210.

4. The Server.

When one or more agents 208 are executing on one or more workstations 110a, the embodiments of the claimed invention provide a network administrator or Server 116 which collects, tracks and responds to data produced by each Agent 208.

The Server 116 comprises a computer system upon which server software is executing. Like the Agent 208, the Server 116 maintains its own database (the "Server Database", illustrated in FIG. 4). In the preferred embodiment, the Server 116 is substantially similar to the Agent 208, but also provides additional functionality not present in the Agent.

This additional functionality allows the Server 116 to manage a plurality of Agents 208. In addition, the Server 116 can install or delete software from each Agent 208, can provide instructions for each Agent 208 and can respond to queries from each Agent 208. Furthermore, the Server 116 can generate a plurality of reports based on the analysis of information it has received from each Agent 208. Preferably, the Server 116 can also generate reports or analyses relating to its own applications, resources and events. Accordingly, the Server 116 is operable to monitor, analyze, and manage the applications, resources and events of both itself and of a plurality of Agents 208.

Preferably, the Server 116 periodically receives from each Agent 208 a data snapshot comprising information about the Agent's 208 resources and events. Like the three-second data snapshot described previously, this data snapshot would include such items as CPU usage, memory usage and page file usage. However, one skilled in the art will understand that any data regarding the applications, resources or events of the Agent 208 may be used. In contrast to the three-second data snapshot described previously, this data snapshot would be sent less frequently than the data is actually measured. In the preferred embodiment, for example, this data snapshot could be taken once every five minutes. In this way, the Server 116 receives significantly less information than is measured by each Agent 208. Although network traffic is minimized, the entire amount of data sampled is still available within each Agent's database 210 should it ever be needed.

In the event that an Agent 208 experiences an interrupt, error or other event outside of its normal operating parameters (an "exceptional event"), the Agent 208 may choose to notify a Server 116 of the exceptional event, so that: (a) the Server 116 may provide instructions to the Agent 208 as to how to handle the exceptional event; (b) the Server will be alerted as to the possibility of similar exceptional events occurring in other Agents 208; and (c) a human network administrator or information technology specialist operating the Server 116 can be appraised of the exceptional event and take further action as necessary.

Should an Agent 208 ever be disconnected or otherwise unable to immediately communicate with a Server 116, such Agent 208 can store in its Agent's Database 210 all data snapshots as well as all exceptional events that it experiences while disconnected, and can transmit this information when once again it is able to communicate with the Server 116.

In addition to using the Server 116 as a trouble shooting tool and information gathering appliance, a network administrator operating the Server 116 can also preferably query and manage the software configurations of various Agents 208. For example, if a network administrator desires to count the number of Agents 208 which have a licensed version of Microsoft® Word stored on their local hard drives, said network administrator can form and send such a query through the Server 116. Upon receipt of this query, each Agent 208 will respond to the Server 116, facilitating an accurate count. With this knowledge, the network administrator may then install Microsoft® Word on the Agents 208 which lack the program, or alternately, delete Microsoft® Word from those Agents 208 which do not need the program. In this fashion, a network administrator may efficiently monitor and distribute licensed applications throughout the entire enterprise 100.

While the Server 116 is preferably included within the management infrastructure of the enterprise 100, it is important to note that no Server 116 is actually necessary in alternate embodiments of the claimed invention. For example, any Agent 208 can preferably communicate with any other Agent 208 to request assistance in responding to an exceptional event. Alternately, any Agent 208 can preferably communicate with any other Agent 208 to notify said other Agent of a problem with a shared resource (e.g., a printer 118 or a local area network 104). In this fashion, Agent-Agent communication may substitute in many ways for Agent-Server communication in a variety of embodiments, and particularly in peer-to-peer networks.

5. Networked Communications.

Figure 4:
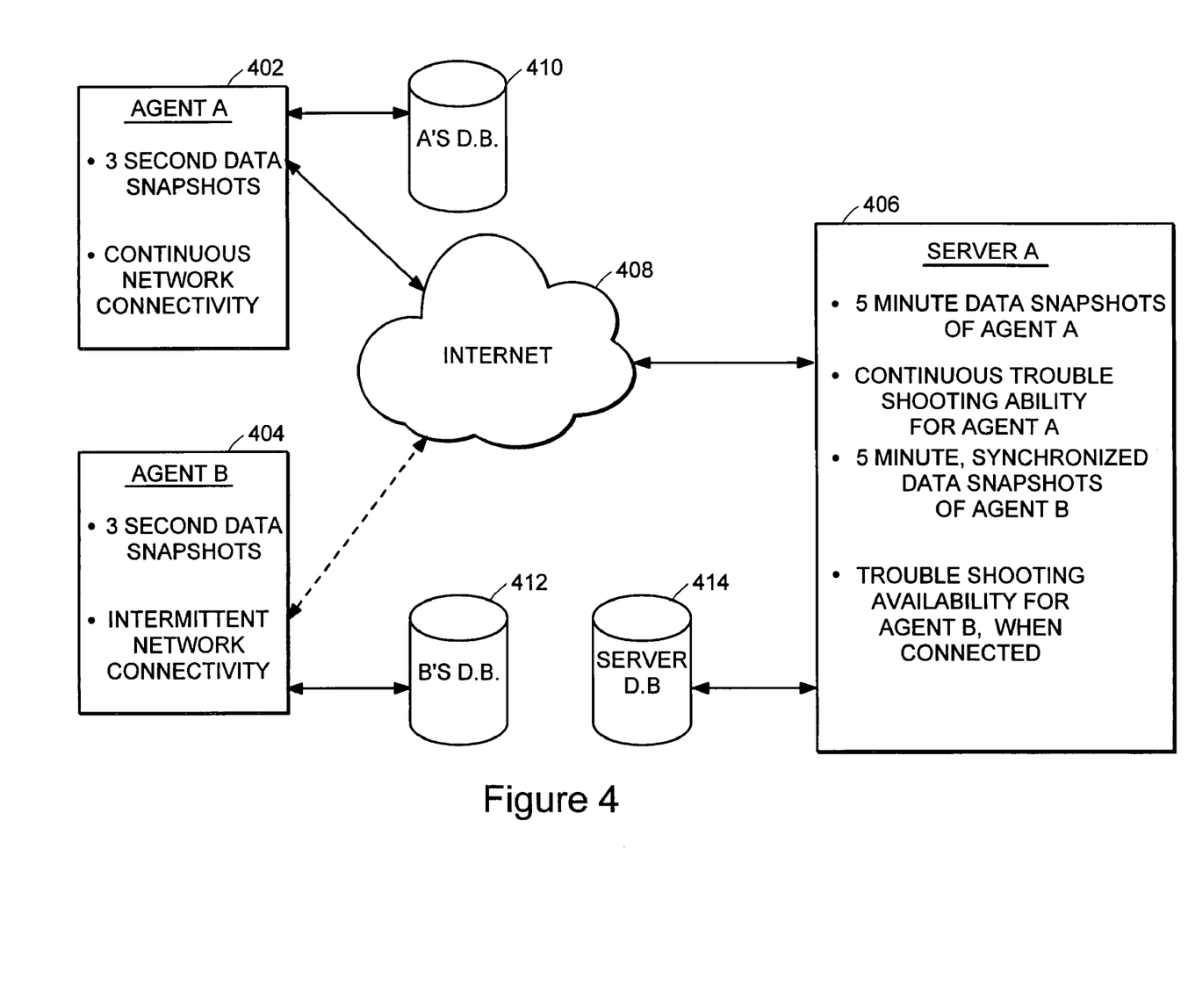
FIG. 4 illustrates a sample networked environment within the enterprise management system.

FIG. 4 illustrates a sample networked environment within the enterprise management system. In the preferred embodiment, one or more Agents 208 are connected with one or more other Agents 208 and one or more Servers 116. As shown in FIG. 4, Agent A 402, Agent B 404 and Server A 406 are all connected with one another through the Internet 408. While Agent A 402 and Server A are continually connected to one another through the internet 408, Agent B 404 is only occasionally connected to the Internet 408. Thus, communications between Agent A 402 and Agent B 404 or between Server A 406 and Agent B 404 occur only when Agent B 404 is connected to the Internet 408.

C. Operation of the Preferred Embodiment.

The operation of preferred embodiment of the claimed invention is described below through the use of hypothetical scenarios and with reference to FIGS. 1-4.

1. Routine Status Updates and Data Propagation.

Agent A 402 is operating on a workstation 110a and connected to the Internet. Every three seconds, a scheduled item within Agent A 402 initiates a query to obtain resource and event information from the operating system 202. A ZIntrcpt 310 traps the requested resource and usage information from the operating system 202 and enters said information (the "normal dataset") into the Queue 308. The Qthread 302, which continually reads information within the Queue 308, reads the normal dataset and, detecting no exceptional events, allows the dataset to remain in its place within the Queue 308. The Agent 208 removes information from the Queue 308 in a First-In First-Out ("FIFO") fashion. Accordingly, the dataset is eventually obtained and evaluated by Agent A 402. Agent A 402 compares the normal dataset with datasets previously stored within A's D.B. 410. As the variance between the normal dataset and the datasets previously stored within A's D.B. is within tolerance limits, Agent A 402 stores the normal dataset in A's D.B. 410.

As it has been five minutes since Agent A 402 last transmitted a dataset to Server A 406, Agent A 402 transmits the normal dataset to Server A 406 through the Internet 408. Server A 406 receives the normal dataset from Agent A 402 and analyzes it for irregularities. Finding none, Server A 406 records the normal dataset in its Server D.B. 414. The cycle repeats, with Agent A 402 recording another normal dataset every three seconds and Server A 406 recording a normal dataset every five minutes.

Upon the initiation of a network administrator operating Server A 406, Server A 406 displays each of the five minute datasets recorded by it. Desiring additional data, the network administrator queries Agent A 402 through the Internet 408 and requests all of Agent A's normal datasets recorded every three seconds throughout the last twenty-four hours. Agent A 402 complies, and transmits all of the requested data back to the network administrator for review. In this fashion, data of varying granularity is preferably stored on individual computer systems (e.g. Agent A 402) throughout the enterprise 100 but is still accessible upon request by any other authorized entity within the enterprise 100 (e.g. Server A 406 or Agent B 404).

2. Exceptional Event Handling.

Assume a human user is currently browsing the web through the use of the workstation 110a, upon which Agent A 402 is executing. As the user navigates the web, he clicks upon a link to a website and receives, instead of the desired content, a dialog box with an error message stating, "Error 404—File Not Found."

As specified previously, Agent A 402 is currently executing on this workstation 110a. Accordingly, a Zintrcpt 312 is constantly monitoring the web browser 204. When the dialog box appears, the Zintrcpt 312 immediately places within the Queue 308 information regarding the error message and the web browser's 204 current state (the "exceptional dataset").

The Qthread, which continually reads information within the Queue 308, reads the exceptional dataset and, recognizing its importance, removes it from the Queue 308 and passes it directly to the Agent 402 for evaluation. Agent A 402, upon receipt of the exceptional dataset, recognizes that the user has encountered an error condition, and promptly records the exceptional dataset into A's D.B. 410.

Contemporaneously with the realization that an error condition has occurred, Agent A 402 preferably initiates four different error-handling routines. First, Agent A 402 notifies the user that an exceptional event has occurred, and asks the user whether to wait or to proceed. The user elects to wait. Second, Agent A 402 searches its D.B. 410 to determine whether or not this exceptional event has occurred previously with respect to the specified website. Agent A 402 does not find any relevant prior information stored in its D.B. 410. Third, Agent A 402 sends a request to Agent B 404 (which at this time is connected to the Internet 408) inquiring whether or not Agent B 404 has experienced any difficulty communicating with the specified website. After searching B's D.B. 412, Agent B 404 responds to Agent A 402 that Agent B has no record of any difficulty reaching the specified website. Fourth, Agent A 402 sends a request to Server A 406 inquiring whether or not Server A 406 has records of any difficulty communicating with the specified website. Server A 406 searches its Server D.B. 414 for any such records. Finding none, Server A 406 notifies the human administrator using Server A 406 of Agent A's 402 request. Knowing of a frequent problem with the website in question, the administrator then transmits to Agent A 402 instructions to use an alternate "Mirror" website. Agent A 402 contacts the Mirror website and the user receives the desired content.

3. Intermittent Connections to other Agents and Servers.

Agent B 404 is executing on a laptop computer 114 and is configured to run precisely the same as Agent A 402. However, as Agent B 404 is mobile, it is only able to connect to the Internet 408 for brief periods of time between long delays. Thus, Agent B 404 cannot constantly communicate with Agent A 402 or Server A 406. Accordingly, Agent B's 404 actions are modified while Agent B 404 is disconnected from the Internet 408.

Like Agent A 402, Agent B 404 also records normal datasets to B's D.B. 412 every three seconds. Also like Agent A 402, Agent B 404 would prefer to send copies of these normal datasets to Server A 406 every five minutes (each, a "five minute dataset"). During periods when Agent B 404 is disconnected from the Internet 408, agent B stores its five minute datasets in its D.B. 412. When Agent B 404 is reconnected to Server A 406 through the Internet 408, Agent B 404 synchronizes its five minute datasets with Server A 406, providing Server A 406 with only those five minute datasets which have been created since the last synchronization.

Similarly, when Agent B 404 is disconnected from the Internet 408 and experiences an exceptional event, Agent B 404 cannot seek assistance from Agent A 402 or Server A 406. Accordingly, Agent B 404 only performs those error handling routines which it can effect while disconnected. Additionally, it stores information about the exceptional event in its D.B. 412, so that, when Agent B 404 reconnects to the Internet 408, it can forward notification of the exceptional event to Agent A 402 and Server A, along with a request for assistance, if necessary.

In this fashion, Agent B 404 can still operate, and can still detect, analyze and handle exceptional events even when not connected to any other Agent 208 or Server 116.

4. Autonomous Error Detection.

Assume that Agent A 402 is executing as described above. As described previously, every three seconds, a scheduled item within Agent A 402 initiates a query to obtain resource and event information from the operating system 202. A ZIntrcpt 310 traps the requested resource and usage information from the operating system 202 and enters said information (the "abnormal dataset") into the Queue 308. The Qthread 302, which continually reads information within the Queue 308, reads the abnormal dataset and, detecting no exceptional events, allows the dataset to remain in its place within the Queue 308. The Agent 208 removes information from the Queue 308 in a FIFO fashion. Accordingly, the abnormal dataset is eventually obtained and evaluated by Agent A 402. Agent A 402 compares the abnormal dataset with normal datasets previously stored within A's D.B. 410 and finds that the variance between the abnormal dataset and the normal datasets previously stored within A's D.B. is not within tolerance limits. Specifically, the workstation's 110a CPU usage is at 100%, while it normally is at 40%.

Agent A 402 then preferably employs a variety of techniques to further assess the nature of the variance of this exceptional event and request assistance, as necessary. For example, Agent A 402 can query the operating system 202 to find out if an application has stopped responding. In addition, Agent A 402 can employ the error handling routines described previously, including: (a) notifying the user that an exceptional event has occurred, and asks the user whether to wait or to proceed; (b) searching its D.B. 410 to determine whether or not this exceptional event has occurred previously, and if so, the nature and duration of the exceptional event; (c) sending a request to Agent B 404 (which at this time is connected to the Internet 408) inquiring whether or not Agent B 404 has experienced a similar exceptional event; or (d) sending a request to Server A 406 inquiring whether or not Server A 406 has records of any of the applications currently running on Agent A 402 commandeering the CPU, and what, if anything should be done.

D. Advantages over the Prior Art.

Through the various embodiments of systems and methods of the claimed invention, a variety of advantages are realized over enterprise management systems previously available. These advantages include:

1. Self-checking Capabilities.

The claimed invention allows each computer system to check its own current performance, resources and events to determine whether or not an error condition or inefficiency is presently occurring. This further allows computer systems to monitor themselves whether or not they are connected to a computer network.

2. Peer-to-Peer Error Comparison.

The claimed invention facilitates the verification of the presence or absence of errors or inefficiencies through peer-to-peer communications, allowing autonomous action for each computer system and greater interaction between peers.

3. Reduction in Management Complexity.

By instilling intelligence with each computer system, the claimed invention allows each computer system to automatically detect, diagnose and correct its own errors and inefficiencies (either alone or through peer-to peer or client/server communications), the burden on network administrators is significantly reduced.

4. Historical Data Storage Improvement through Distributed Granularity.

Through the introduction of databases on each agent, the claimed invention allows each computer system to store its own historical data. Thus, a Server 116 need not store historical data for every computer on the network. Accordingly, network traffic due to enterprise management is significantly reduced. No single, enormous data repository is necessary for the storage of historical data, even for large numbers of managed computer systems. However, should an administrator ever desire to access the historical data, he or she may do so by accessing information of varying granularity stored on either a Server 116 or Agent's Database 210.

5. Real-Time Error Detection and Handling.

As each Agent 208 expeditiously receives information regarding resources and events from the Queue 308 and can immediately compare such information to that stored in the Agent's Database 210, the Agent 208 can determine in real time whether or not the characteristics of the system are currently outside the specified tolerances.

In this fashion, embodiments of the present invention facilitate the management of distributed computer systems in an enterprise. It will be appreciated by those skilled in the art that various omissions, additions and modifications can be made to the methods and systems described above without departing from the scope of the invention, and all such modifications and changes are intended to fall within the scope of the invention, as defined by the appended claims.

We claim:

1. A method of analyzing resources and events of a computing environment comprising:
   (a) storing in a first database located within a first computer a first dataset describing the resource and event characteristics of the first computer at a first moment in time;
   (b) storing in the first database a second dataset describing the resource and event characteristics of the first computer at a second moment in time;
   (c) comparing, by an agent of the first computer system, the first dataset and the second dataset in order to determine whether the differences indicate the occurrence of an exceptional event; and
   (d) when an exceptional event has occurred, initiating by the agent of the first computer system an exception handling routine comprising:
      i. establishing communication with an agent executing on a second computer, the established communication occurring in a peer-to-peer fashion;
      ii. querying the second agent to determine if a substantially similar exceptional event occurred at the second computer; and
      iii. receiving a response from the agent of the second computer, the response comprising information related to the substantially similar exceptional event.

2. The method of claim 1 wherein initiating an exception handling routine further comprises notifying a human user of the exceptional event at the first computer.

3. The method of claim 1 further comprising notifying a server of the occurrence of an exceptional event at the first computer.

4. The method of claim 1, further comprising storing a notification of the exceptional event in a second database.

5. The method of claim 4 wherein the storing comprises, storing the notification of the exceptional event in the second database, the second database being located at the second computer.

6. The method of claim 1, further comprising storing the response in the first database.

7. The method of claim 6 further comprising storing the response in the a second database, the second database being located at a server.

8. The method of claim 1 wherein receiving a response from the agent of the second computer comprises, receiving instructions from the second computer, the instructions comprising an action to be taken by the first computer in response the exceptional event.

9. The method of claim 1 wherein the resources and event characteristics of the first computing device comprise at least one process executing on the first computer.

10. The method of claim 1 wherein the resources and event characteristics of the first computing device comprise at least one system resource executing on the first computer.

11. The method of claim 1 wherein the resources and event characteristics of the first computing device comprise at least one application event occurring on the first computer.

12. The method of claim 1 wherein the resources and event characteristics of the first computing device comprise at least one end-user action executed on the first computer.

13. The method of claim 1 wherein the resources and event characteristics of the first computing device comprise at least one operating system event occurring on the first computer.

14. The method of claim 1 wherein the resources and event characteristics of the first computing device comprise at least one shared network system in communication with the first computer.

15. The method of claim 1 wherein the resources and event characteristics of the first computing device comprise at least one shared network resource in communication with the first computer.

16. The method of claim 1 further comprising:
   iv. establishing communication with an agent executing on a third computer, the established communication occurring in a peer-to-peer fashion between the second computer and the third computer;
   v. querying the third agent to determine if a substantially similar exceptional event occurred at the third computer; and
   vi. receiving a response from the agent of the third computer, the response comprising information related to the substantially similar exceptional event.

17. The method of claim 16 wherein the receiving a response from the agent of second computer comprises receiving a response from the agent of the second computer wherein the response comprises the response from the agent of the third computer.

18. The method of claim 1 receiving a response from the agent of the second computer comprises, receiving a response after the agent of the second computer compares a first dataset and a second data set stored in a database of the second computer to determine whether the exceptional event occurred at the second computer.

19. The method of claim 1 wherein receiving a response from the agent of the second computer comprises, receiving a response from a server storing an aggregation of exceptional events from a plurality of agents each executing on a respective computer.

20. A system for analyzing resources and events of a computing environment, the system comprising:
 a first computer comprising a first database that stores a plurality of datasets that described resource and event characteristics of the first computer at respective moments in time; and
 an agent in communication with the first computer, the agent comparing at least two respective datasets of the database to determine whether the differences between the datasets indicate the occurrence of an exceptional event and initiating an exception handling routine when the difference indicate an exceptional event occurred, the exception handling routine comprising:
  establishing peer-to-peer communication with an agent executing on a second computer;
  querying the second agent to determine if a substantially similar exceptional event occurred at the second computer; and
  receiving a response from the agent of the second computer, the response comprising information related to the substantially similar exceptional event.

21. The system of claim 20 wherein the exception handling routine further comprises notifying a human user of the exceptional event.

22. The system of claim 20 wherein the exception handling routine further comprises notifying a server of the exceptional event.

23. The system of claim 20 wherein the first database stores the occurrence of the exceptional event therein.

24. The system of claim 20 wherein the first database stores the response therein.

25. The system of claim 20 wherein the agent transmits the occurrence of the exceptional event to the second computer and wherein the second computer stores the exceptional event in a second database associated with the second computer.

26. The system of claim 25 wherein the second computer is a server.

27. The system of claim 20 wherein the response comprises instructions to execute in response to the occurrence of the exceptional event.

28. The system of claim 20 wherein the resources and event characteristics of the first computing device comprise at least one process executing on the first computer.

29. The system of claim 20 wherein the resources and event characteristics of the first computing device comprise at least one system resource executing on the first computer.

30. The system of claim 20 wherein the resources and event characteristics of the first computing device comprise at least one application event occurring on the first computer.

31. The system of claim 20 wherein the resources and event characteristics of the first computing device comprise at least one end-user action executed on the first computer.

32. The system of claim 20 wherein the resources and event characteristics of the first computing device comprise at least one operating system event occurring on the first computer.

33. The system of claim 20 wherein the resources and event characteristics of the first computing device comprise at least one shared network system in communication with the first computer.

34. The system of claim 20 wherein the resources and event characteristics of the first computing device comprise at least one shared network resource in communication with the first computer.

35. The system of claim 20 wherein the exception handling routine further comprises:
 establishing communication with an agent executing on a third computer, the established communication occurring in a peer-to-peer fashion between the second computer and the third computer;
 querying the third agent to determine if a substantially similar exceptional event occurred at the third computer; and
 receiving a response from the agent of the third computer, the response comprising information related to the substantially similar exceptional event.

36. The system of claim 35 wherein the response received from the second computer comprises the response from the third computer.

37. The system of claim 20 wherein the agent of the second computer compares at least two respective datasets of a second database to determine whether the differences between the datasets indicate the occurrence of a substantially similar exceptional event.

38. The system of claim 20 wherein the response received from the second computer comprises a response from a server storing an aggregation of exceptional events from a plurality of agents each executing on a respective computer.

39. A system for analyzing resources and events of a computing environment, the system comprising:
 (a) means for storing in a first database located within a the first computer a first dataset describing the resource and event characteristics of the first computer at a first moment in time;
 (b) means for storing in the first database a second dataset describing the resource and event characteristics of the first computer at a second moment in time;
 (c) means for comparing, the first dataset and the second dataset in order to determine whether the differences indicate the occurrence of an exceptional event; and
 (d) when an exceptional event has occurred, initiating means for executing an exception handling routine, the routine comprising:
  i. establishing communication with an agent executing on a second computer, the established communication occurring in a peer-to-peer fashion;
  ii. querying the second agent to determine if a substantially similar exceptional event occurred at the second computer; and
  iii. receiving a response from the agent of the second computer, the response comprising information related to the substantially similar exceptional event.

40. The system of claim 39 wherein the exception handling routine further comprises notifying a human user of the exceptional event at the first computer.

41. The system of claim 39 wherein the exception handing routine further comprises notifying a server of the occurrence of an exceptional event at the first computer.

42. The system of claim 39 further comprising means for storing the notification of the exceptional event in a second database.

43. The system of claim 39 further comprising means for storing the response in the first database.

44. The system of claim 39 further comprising means for storing the notification of the exceptional event in the second database, the second database being located at the second computer.

45. The system of claim 39 wherein the instructions received from the second computer comprise an action to be taken by the first computer in response the exceptional event.

46. The system of claim 39 further comprising means for storing the response in the a second database, the second database being located at a server.

47. The system of claim 39 wherein the resources and event characteristics of the first computing device comprise at least one process executing on the first computer.

48. The system of claim 39 wherein the resources and event characteristics of the first computing device comprise at least one system resource executing on the first computer.

49. The system of claim 39 wherein the resources and event characteristics of the first computing device comprise at least one application event occurring on the first computer.

50. The system of claim 39 wherein the resources and event characteristics of the first computing device comprise at least one end-user action executed on the first computer.

51. The system of claim 39 wherein the resources and event characteristics of the first computing device comprise at least one operating system event occurring on the first computer.

52. The system of claim 39 wherein the resources and event characteristics of the first computing device comprise at least one shared network system in communication with the first computer.

53. The system of claim 39 wherein the resources and event characteristics of the first computing device comprise at least one shared network resource in communication with the first computer.

54. The system of claim 39 wherein the exception handling routine further comprises:
 iv. establishing communication with an agent executing on a third computer, the established communication occurring in a peer-to-peer fashion between the second computer and the third computer;
 v. querying the third agent to determine if a substantially similar exceptional event occurred at the third computer; and
 vi. receiving a response from the agent of the third computer, the response comprising information related to the substantially similar exceptional event.

55. The system of claim 54 wherein the receiving a response from the agent of second computer comprises receiving a response from the agent of the second computer wherein the response comprises the response from the agent of the third computer.

56. The system of claim 39 receiving a response from the agent of the second computer comprises, receiving a response after the agent of the second computer compares a first dataset and a second data set stored in a database of the second computer to determine whether the exceptional event occurred at the second computer.

57. The system of claim 39 wherein receiving a response from the agent of the second computer comprises, receiving a response from a server storing an aggregation of exceptional events from a plurality of agents each executing on a respective computer.

\* \* \* \* \*